(12) United States Patent
Zhuang et al.

(10) Patent No.: US 7,730,152 B2
(45) Date of Patent: Jun. 1, 2010

(54) WIRELESS INPUT CONTROL OF MULTIPLE COMPUTING DEVICES

(75) Inventors: Yuan Zhuang, San Diego, CA (US); Chikan Kwan, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1678 days.

(21) Appl. No.: 10/879,452

(22) Filed: Jun. 28, 2004

(65) Prior Publication Data

US 2005/0289225 A1   Dec. 29, 2005

(51) Int. Cl.
G06F 15/16 (2006.01)
G06F 3/00 (2006.01)
G05B 19/18 (2006.01)

(52) U.S. Cl. .................. 709/208; 710/1; 700/3
(58) Field of Classification Search .................. 709/208
See application file for complete search history.

(56) References Cited

U.S. PATENT DOCUMENTS

| | | | |
|---|---|---|---|
| 6,304,895 B1* | 10/2001 | Schneider et al. | 709/203 |
| 6,879,570 B1* | 4/2005 | Choi | 370/329 |
| 2002/0028657 A1* | 3/2002 | Davies | 455/41 |
| 2002/0116539 A1* | 8/2002 | Bryczkowski et al. | 709/317 |
| 2002/0128041 A1* | 9/2002 | Parry | 455/560 |
| 2003/0051021 A1* | 3/2003 | Hirschfeld et al. | 709/223 |
| 2003/0080874 A1* | 5/2003 | Yumoto et al. | 340/825.71 |
| 2003/0084133 A1* | 5/2003 | Chan et al. | 709/222 |
| 2003/0092437 A1* | 5/2003 | Nowlin et al. | 455/420 |
| 2004/0038712 A1* | 2/2004 | Ikegami et al. | 455/560 |
| 2004/0049552 A1* | 3/2004 | Motoyama et al. | 709/208 |
| 2004/0117513 A1* | 6/2004 | Scott | 710/1 |

(Continued)

OTHER PUBLICATIONS

Ranta & McGowan, Eds. Bluetooth Human Interface Device (HID) Profile, Version 1.0, May 22, 2003.*

(Continued)

*Primary Examiner*—Saleh Najjar
*Assistant Examiner*—Robert Shaw
(74) *Attorney, Agent, or Firm*—Garlick Harrison & Markison; Timothy W. Markison

(57) ABSTRACT

A method for input control of multiple computing devices from a single set of input devices begins by providing, by a master input device of the single set of input devices, a connection request to the multiple computing devices via a wireless channel, wherein the connection request identifies one of the multiple computing devices. The method continues by interpreting, by each of other ones of the multiple computing devices, the connection request to determine that the connection request is not addressing the each of the other ones of the multiple computing devices. In response to the connection request, the method continues by providing, by the one of the multiple computing devices, a connection response to the master input device via the wireless channel. The method continues by providing, by the one of the multiple computing devices, a slave connection request to at least one slave input device of the single set of input devices via the wireless channel. The method continues by, in response to the slave connection request, providing, by the at least one slave input device, a second connection response to the one of the multiple computing devices via the wireless channel such that the master input device and the at least one slave input device provide input to the one of the multiple computing devices via the wireless channel.

29 Claims, 5 Drawing Sheets

U.S. PATENT DOCUMENTS

| | | | |
|---|---|---|---|
| 2004/0203378 A1* | 10/2004 | Powers | 455/41.2 |
| 2004/0221009 A1* | 11/2004 | Cook et al. | 709/203 |
| 2005/0044184 A1* | 2/2005 | Thomas et al. | 709/219 |
| 2005/0086273 A1* | 4/2005 | Loebbert et al. | 707/204 |
| 2005/0204026 A1* | 9/2005 | Hoerl | 709/223 |
| 2005/0240685 A1* | 10/2005 | Keys | 710/8 |
| 2005/0254444 A1* | 11/2005 | Meier et al. | 370/312 |
| 2007/0282997 A1* | 12/2007 | Trochman | 709/224 |

OTHER PUBLICATIONS

Jennifer Bray; Charles F. Sturman, Bluetooth™ 1.1: Connect Without Cables, Second Edition, Prentice Hall (Dec. 17, 2001).*

RealVNC (2002) http://web.archive.org/web/20030604194131/realvnc.com/howitworks.html.*

* cited by examiner set-up wireless inputs tear down of wireless inputs

WIRELESS INPUT CONTROL OF MULTIPLE COMPUTING DEVICES

BACKGROUND OF THE INVENTION

1. Technical Field of the Invention

This invention relates generally to wireless communications and more particularly to wireless input control of multiple computing devices.

2. Description of Related Art

FIG. 1 is a schematic block diagram of a conventional wired system that includes a plurality of human interface devices (HID), a switch, and a plurality of computers. In this illustration, the human interface devices include a keyboard and a mouse. The computers include a work station, PC computer, laptop computer and/or personal digital assistant (PDA) game console, et cetera.

As shown, the human interface devices are coupled via wires to a switch, which is in turn coupled via wires to each of the computers. The switch enables the human interface devices to act as the inputs for a selected one of the computers. For example, if the switch couples the keyboard and mouse to the computer, the keyboard and mouse function as input devices to the computer. Alternatively, the switch could be set to couple the keyboard and mouse to the work station. In this instance, the keyboard and mouse would provide input to the work station.

While such a system allows a single set of human interface devices to function as the input devices for one of a plurality of computers, it requires a switch and hard wire connections between the switch and each of the human interface devices as well as between the switch and the computer devices.

FIG. 2 is a schematic block diagram of another prior art computing system that includes the human interface devices, a radio frequency (RF) dongle, the switch, and the plurality of computers. In this system, the hard wire connections between the human interface devices (e.g., the keyboard and mouse) and the switch are replaced by a wireless link. To support the wireless link, the system includes the RF dongle.

While the system of FIG. 2 offers the advantages of wireless connectivity of the human interface devices, it requires the addition of an RF dongle (with respect to the system of FIG. 1) and still requires the switching function. With the additional equipment, the cost of the system increases and adds the inconvenience of having to hard wire the components.

Therefore, a need exists for a system that substantially eliminates the need for a switch and reduces the hard wiring connections.

BRIEF SUMMARY OF THE INVENTION

The wireless input control of multiple computing devices of the present invention substantially meets these needs and others. In one embodiment, a method for input control of multiple computing devices from a single set of input devices begins by providing, by a master input device of the single set of input devices, a connection request to the multiple computing devices via a wireless channel, wherein the connection request identifies one of the multiple computing devices. The method continues by interpreting, by each of other ones of the multiple computing devices, the connection request to determine that the connection request is not addressing the each of the other ones of the multiple computing devices. In response to the connection request, the method continues by providing, by the one of the multiple computing devices, a connection response to the master input device via the wireless channel. The method continues by providing, by the one of the multiple computing devices, a slave connection request to at least one slave input device of the single set of input devices via the wireless channel. The method continues by, in response to the slave connection request, providing, by the at least one slave input device, a second connection response to the one of the multiple computing devices via the wireless channel such that the master input device and the at least one slave input device provide input to the one of the multiple computing devices via the wireless channel.

In another embodiment, a method for input control of multiple computing devices from a single set of input devices begins by receiving, by a master input device of the single set of input devices, a request to change input control from a first multiple computing device of the multiple computing devices to a second multiple computing device of the multiple computing devices. The method continues by providing, by the master input device, a request for disconnection of a wireless connection between the single set of input devices and the first multiple computing device via a wireless channel. The method continues by, in response to the request for the disconnection, providing, by the first multiple computing device, a slave disconnection request to each slave input device of the single set of input devices via the wireless channel. The method continues by, in response to the slave disconnection request, providing, by each slave input device, a slave acceptance of the disconnection to the first multiple computing device via the wireless channel. The method continues by, in response to receiving the slave acceptance of the disconnection, providing, by the first multiple computing device, an acceptance of the disconnection to the master input device via the wireless channel. The method continues by establishing a new wireless connection between the single set of input devices and the second multiple computing device.

In yet another embodiment, a master input device of a single set of input devices used for input control of multiple computing devices includes a processing module and memory. The memory is operably coupled to the processing module, wherein the memory stores operational instructions that cause the processing module to provide a connection request to the multiple computing devices via a wireless channel, wherein the connection request identifies one of the multiple computing devices. The memory also stores operational instructions that cause the processing module to receiving, from the one of the multiple computing devices, a connection response via the wireless channel, wherein the one of the multiple computing devices establishes a wireless connection with at least one slave input device of the single set of input devices via the wireless channel.

In a further embodiment, a slave input device of a single set of input devices used for input control of multiple computing devices includes a processing module and memory. The memory is operably coupled to the processing module, wherein the memory stores operational instructions that cause the processing module to receive, from one of multiple computing devices, a slave connection request via the wireless channel. The memory also stores operational instructions that cause the processing module to, in response to the slave connection request, provide a second connection response to the one of the multiple computing devices via the wireless channel such that a master input device and the slave input device provide input to the one of the multiple computing devices via the wireless channel.

In a still further embodiment, a computing device capable of receiving input from a single set of input devices includes a processing module and memory. The memory is operably coupled to the processing module, wherein the memory stores operational instructions that cause the processing module to receive, from a master input device of the single set of input devices, a connection request via a wireless channel, wherein the connection request identifies the computing devices. The memory also stores operational instructions that cause the processing module to, in response to the connection request, provide a connection response to the master input device via the wireless channel and provide a slave connection request to at least one slave input device of the single set of input devices via the wireless channel. The memory also stores operational instructions that cause the processing module to, in response to the slave connection request, receive, from the at least one slave input device, a second connection response via the wireless channel such that the master input device and the at least one slave input device provide input to the computing device via the wireless channel.

In yet a further embodiment, a master input device of a single set of input devices used for input control of multiple computing devices includes a processing module and memory. The memory is operably coupled to the processing module, wherein the memory stores operational instructions that cause the processing module to receive a request to change input control from a first multiple computing device of the multiple computing devices to a second multiple computing device of the multiple computing devices. The memory also stores operational instructions that cause the processing module to provide a request for disconnection of a wireless connection between the single set of input devices and the first multiple computing device via a wireless channel, wherein, in response to the request for the disconnection, the first multiple computing device provides a slave disconnection request to each slave input device of the single set of input devices via the wireless channel and wherein, in response to the slave disconnection request, each slave input device provides a slave acceptance of the disconnection to the first multiple computing device via the wireless channel. The memory also stores operational instructions that cause the processing module to, in response to receiving the slave acceptance of the disconnection, receive, from the first multiple computing device, an acceptance of the disconnection to the master input device via the wireless channel. The memory also stores operational instructions that cause the processing module to establish a new wireless connection between the single set of input devices and the second multiple computing device.

In yet a still further embodiment, a computing device capable of receiving input from a single set of input devices includes a processing module and memory. The memory is operably coupled to the processing module, wherein the memory stores operational instructions that cause the processing module to receive, from a master input device of the single set of input devices, a request for disconnection of a wireless connection between the single set of input devices and the computing device via a wireless channel. The memory also stores operational instructions that cause the processing module to, in response to the request for the disconnection, provide a slave disconnection request to each slave input device of the single set of input devices via the wireless channel. The memory also stores operational instructions that cause the processing module to, in response to the slave disconnection request, receive, from each slave input device, a slave acceptance of the disconnection to the first multiple computing device via the wireless channel. The memory also stores operational instructions that cause the processing module to, in response to receiving the slave acceptance of the disconnection, provide an acceptance of the disconnection to the master input device via the wireless channel, such that a new wireless connection between the single set of input devices and a second computing device is established.

DETAILED DESCRIPTION OF THE INVENTION

Figure 1:
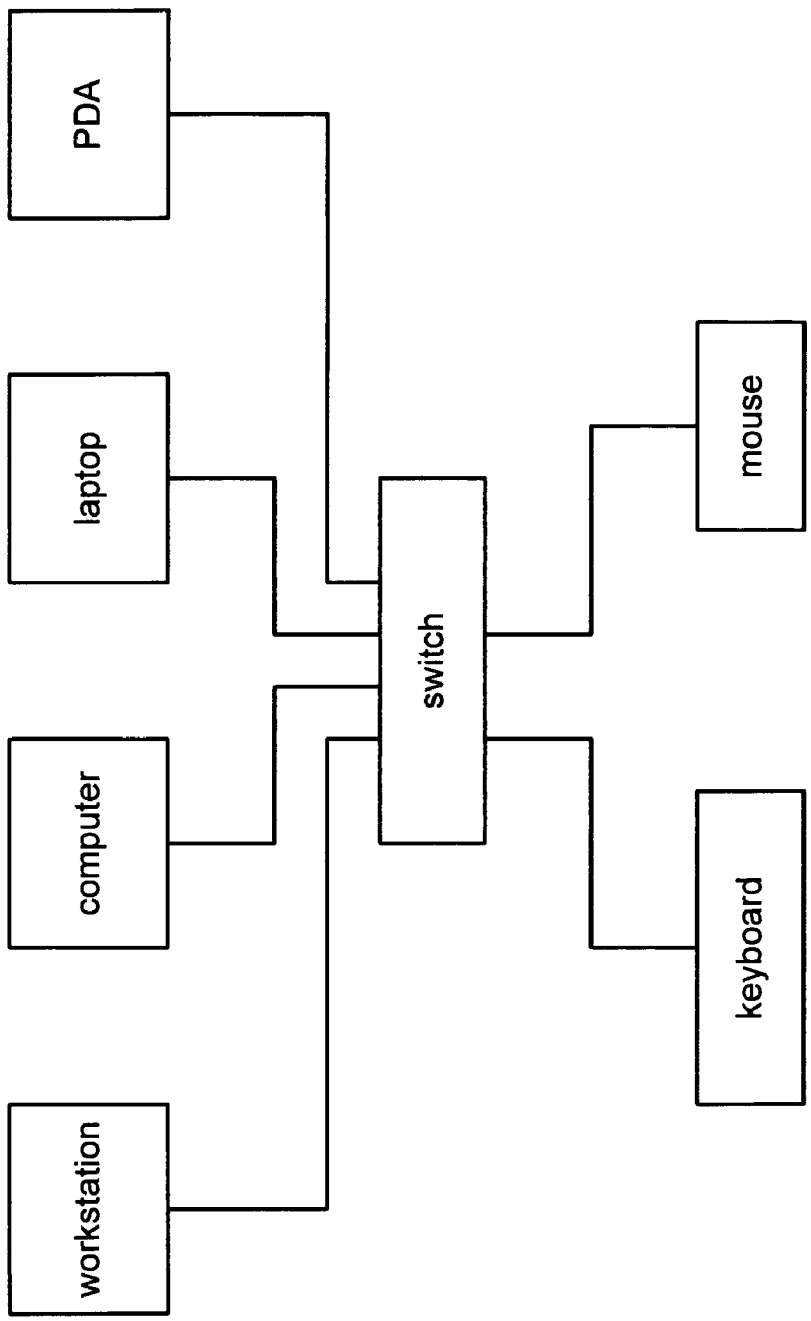
FIG. 1 is a schematic block diagram of a prior art computing system.
Figure 2:
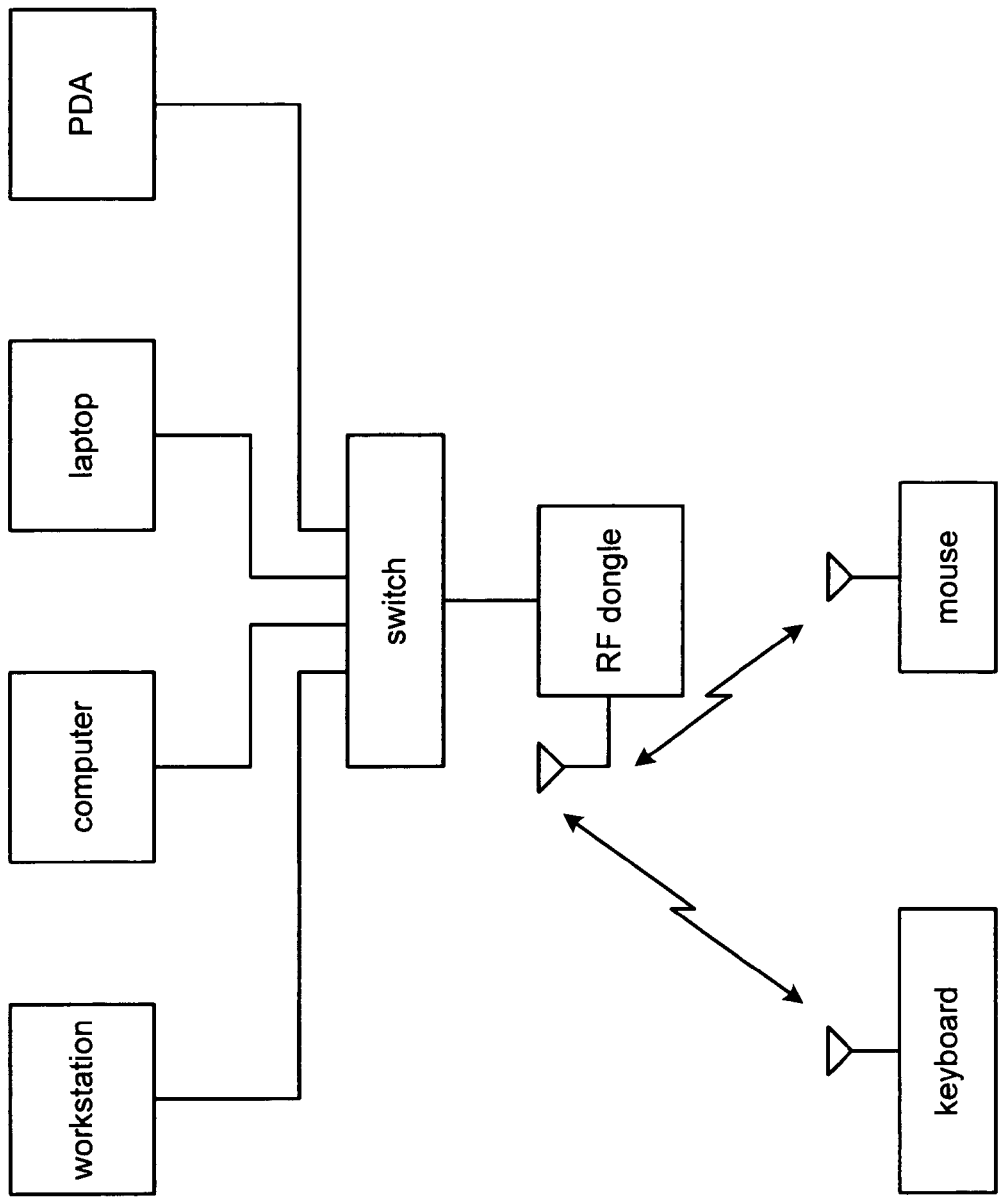
FIG. 2 is a schematic block diagram of another prior art computing system.
Figure 3:
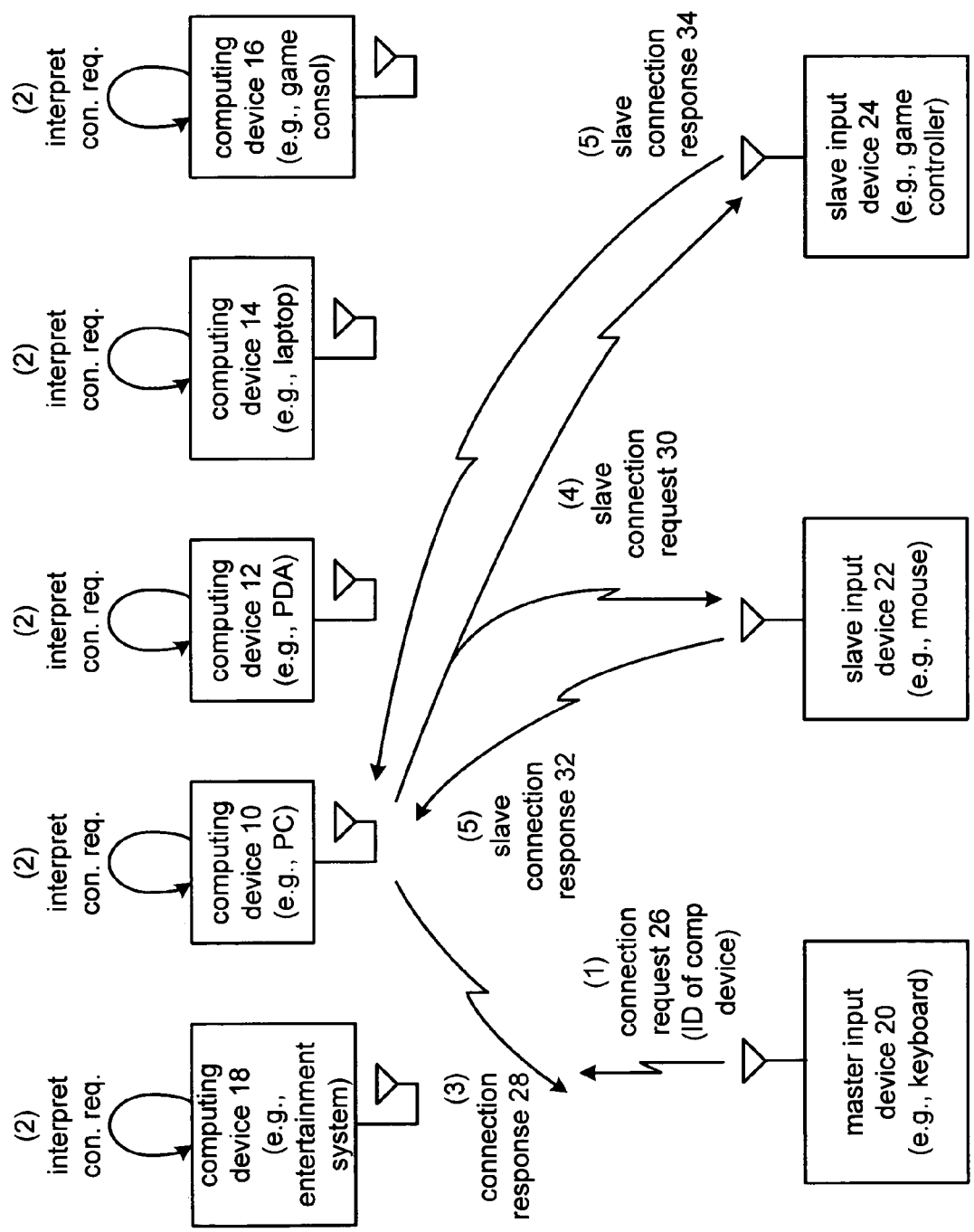
FIG. 3 is a schematic block diagram and functional diagram of a computing system setting up a wireless communication bonding in accordance with the present invention.

FIG. 3 is a schematic block diagram of a computing system in accordance with the present invention. The computing system includes a plurality of computing devices 10-18 and a plurality of input devices 20-24. The computing devices 10-18 may be one or more of entertainment systems, personal computer, personal digital assistants, laptop computers, game console, et cetera. The input devices 20-24 may be a keyboard, a computer mouse, a game controller, a keypad, a pointer and/or any other input device. In one embodiment, the input devices 20-24 act as a set of input devices for a selected one of the computing devices 10-18.

As shown, each of the computing devices 10-18 and each of the input devices 20-24 include an antenna and corresponding RF transceiver section. The RF transceiver, in one embodiment, may be in accordance with one or more of the BLUETOOTH™ standards. Accordingly, the transmission of data via the RF transceivers is done in accordance with the corresponding BLUETOOTH™ standard.

To facilitate the set-up of the set of input devices 20-24 functioning as the input for one of the computing devices 10-18, the user of the system typically assigns a component ID (i.e.. identification code) in accordance with the particular wireless communication standard being implemented. For example, if the wireless communication standard is BLUETOOTH™, the computing devices and input devices will have a corresponding BLUETOOTH™ ID.

Further, the user will select one of the computing devices to be bonding to the set of input devices 20-24. This may be done by the user via the master input device 20 or via a graphical user interface on a computing device that is currently bonded to the set of input devices. At start up of the system, it may be desirable to make the initial computer selection via the master input device.

Regardless of how the computing device is identified, once the master input device 20 recognizes a request from the user to establish a bonding between the set of input devices and the identified computing device, the master input device 20 transmits a connection request 26 to each of the computing devices 10-18. The connection request includes an ID of the targeted computing device and may be implemented as a packet as will be further described with reference to FIG. 5.

Upon receiving the connection request 26, each of the computing devices 10-18 interprets the connection request 26 to determine whether it is the target of the connection request. In this example, the computing device 10, which may be a personal computer or a MAC based computer, is the target. Upon recognizing itself as the target, the computing device 10 transmits a connection response 28 to the master input device 20 to establish a wireless bonding of the computing device 10 and the master input device 20. The formatting of the connection response 28 may be in accordance with the particular wireless standard being supported by the piconet (e.g., BLUETOOTH™).

In addition to providing the connection response to the master input device 20, the computing device 10 provides a slave connection request 30 to each of the slave input devices 20-24. The slave connection request may be in accordance with the particular standard being supported by the piconet (e.g., BLUETOOTH™). Each of the slave input devices, which may be a mouse, game controller, et cetera, interprets the slave connection request 30 and in response, provides a slave connection response 32 and 34 back to the computing device 10. Note that the slave connection response may be in accordance with the particular standard being supported by the piconet (e.g., BLUETOOTH™). Once the computing device 10 receives the slave connection responses, it is wirelessly bonded to the set of input devices 20-24 while the remaining computing devices 12-18 are not bonded to the input devices 20-24. As such, any inputs provided by one or more of the input devices will be processed by computing device 10 and ignored by the other computer devices 12-18.

Once the input devices 20-24 are bonded with a particular computing device (in this example computing device 10) the bonding remains until the user tears it down. Once the bonding is torn down, a new bonding may be established. In addition, when an input device is out of range with respect to the computing device, its bonding to the computing device may be automatically torn down by the computing device.

Figure 4:
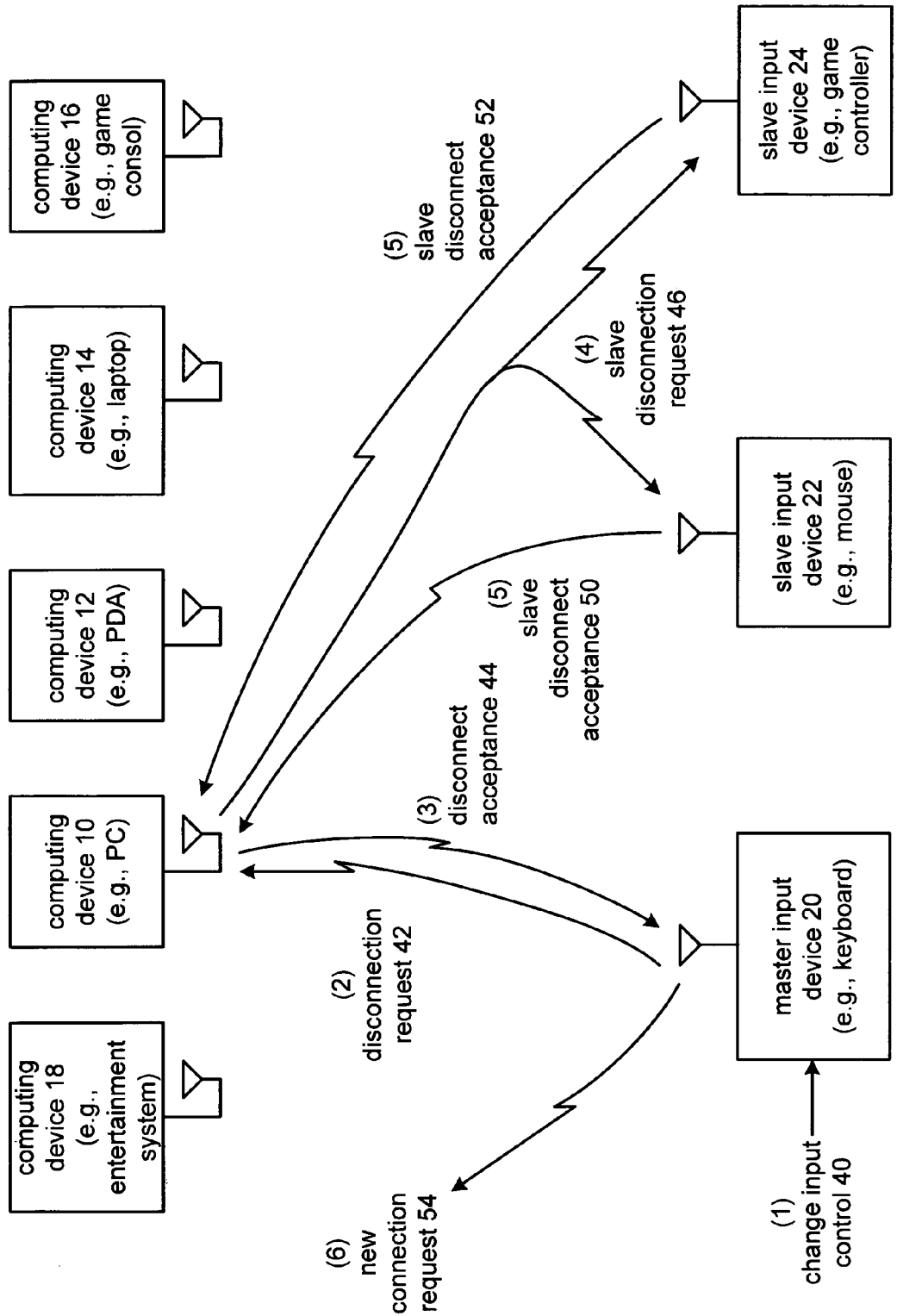
FIG. 4 is a schematic block diagram block diagram and functional diagram of the computing system tearing down a wireless communication bonding in accordance with the present invention.

FIG. 4 is a schematic and functional diagram of the computing system tearing down the bonding of the input devices 20-24 to a particular one of the computing devices. The tearing down of the bonding may be done in response to a user request to tear down the bonding or to change the bonding to another computing device. To begin the process, the master input device receives a change input control signal 40, which may be a tear down request or a change bonding request. The change input control signal 40 may be initiated via a particular keystroke on a keyboard or via a graphical user interface of the then currently bonded computing device (e.g., computing device 10). Regardless of the mechanism for triggering the change input control signal 40, once the master device 20 detects the change signal 40, it transmits a disconnection request 42 to the particular computing device, in this example computing device 10. The disconnection request 42 will be in accordance with the particular wireless protocol being supported by the piconet, for example BLUETOOTH™.

In response to the disconnection request 42, the computing device 10 provides a disconnection acceptance message 44 back to the master input device 20. In addition, the computing device 10 provides a slave disconnection request 46, in accordance with the corresponding wireless standard, to the slave input devices 22 and 24.

In response to the slave disconnection request 46, each of the slaves provides a slave disconnection acceptance message 50 and 52 to the computing device 10. At this point, the bonding of the input devices to computing device 10 has been torn down.

If the change input control signal 40 indicates a change in the bonding, the master input device 20 then provides a new connection request 54 to the computing device to which the user wants to bond the input devices. The establishment of the bonding of the input devices 20-24 to a particular computing device 10-18 was previously described with reference to FIG. 3. Note that the master input device 20 will not provide the new connection request 54 until the wireless bonding of all of the input devices to the particular computing device has been torn down. As one of average skill in the art will appreciate, any one of the input devices may act as the master input device.

Note that if the change input control signal 40 was provided via a graphical user interface, the process may be done by selecting via one of the input devices (e.g., mouse, keyboard, et cetera), a graphical icon on the display of the particular computing device (e.g., computing device 10). In response to the graphical icon selection, the corresponding computing device 10 provides a graphical listing of each of the computing devices in the system. The user, via one of the input devices, selects another one of the computing devices to bond the input devices to. The computing device 10, upon detecting the selection of the particular computing device provides the identity back to the master input device 20 such that it may generate the new connection request 54 and establish the new bonding as previously described with reference to FIG. 3.

Figure 5:
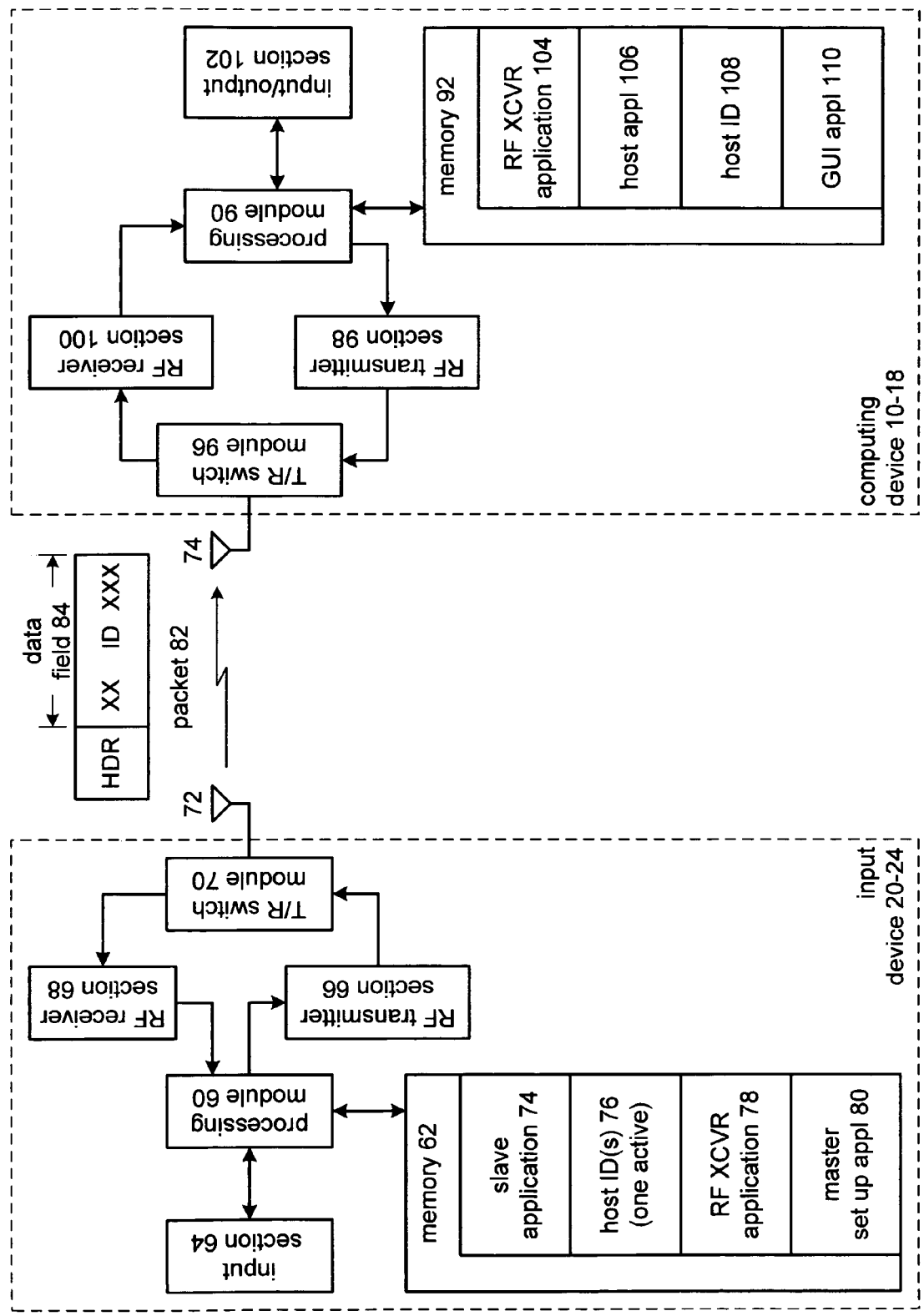
FIG. 5 is a schematic block diagram of the wireless input devices and corresponding computing devices in accordance with the present invention.

FIG. 5 is a schematic block diagram of an input device 20-24 and a computing device 10-18. The input device 20-24 includes an input selection module 64, a processing module 60, an RF receiver section 68, an RF transmitter section 66, a transmit/receive switch module 70, and an antenna 72. The input device 20-24 further includes memory 62 that stores a plurality of software algorithms including a slave application, a host ID 76, an RF transceiver application 78 and a master set-up application 80. The computing device 10-18 includes a transmit/receive switch module 96, an RF transmitter section 98, an RF receiver section 100, a processing module 90, an input/output selection module 102 and memory 92. Memory 92 stores a plurality of software algorithms including an RF transceiver application 104, a host application 106, a host ID field or fields 108, and may further include a graphical user interface (GUI) application 110. In addition, the memory may include one or more algorithms to support the particular functionality of the computing device including, but not limited to, word processing, web browser, gaming et cetera.

The processing modules 60 and 90 may each be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 62 and 92 may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 60 and/or 90 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 62 and 92 stores, and the processing modules 60 and 90 execute, operational instructions corresponding to at least some of the steps and/or functions illustrated in FIGS. 3-5.

In one embodiment, the RF transceiver applications 78 and 104 are in accordance with the BLUETOOTH™ standard. In this instance, data that is transceived between the input device 20-24 and computing device 10-18 is done in packets that are formatted in accordance with the BLUETOOTH™ standard. To facilitate the bonding of the set of input devices to a particular computing device, a new packet structure 82 is formatted to include a traditional header section and a data field 84 that includes the ID of the targeted computing device and null data (which is represented by x).

The computing devices 10-18 upon receiving packet 82 interpret the data field 84 in accordance with the host application 106 and/or host ID 108 to determine whether it is the target of packet 82. If so, it evokes the host application 106 to facilitate the set-up of bonding of the wireless inputs to the computing device as described in FIG. 3 or to tear down the bonding of the wireless inputs to the computing device as shown in FIG. 4.

To generate the special packet 82 to identify the set-up or tear down of the bonding, the master input device utilizes the master set-up application 80. In the slave devices, the master set-up application is inactive. Once the set-up or tear down of the bonding of the input devices to the computing device is initiated, the input devices 20-24 and computing devices 10-18 utilize the RF transceiver applications 70 and 104 to facilitate, in accordance with the particular standard, the set-up or tear down of the wireless connections.

As one of average skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method an apparatus for wireless bonding of a set of input devices to one of a plurality of computing devices. As one of average skill in the art will appreciate, other embodiments may be derived from the teaching of the present invention without deviating from the scope of the claims.

What is claimed is:

1. A method for input control of multiple computing devices from a plurality of input devices, the method comprises:

directly transmitting, by a master input device of a plurality of input devices, an initial connection request to multiple computing devices via a wireless channel, wherein the initial connection request identifies one of the multiple computing devices to produce a selected computing device;

interpreting, by each of the multiple computing devices, the connection request, wherein the selected computing device determines that it is addressed by the connection request and each of other ones of multiple computing devices determine that it is not addressed by the connection request;

in response to the initial connection request:

directly transmitting, by the selected computing device, an initial connection response to the master input device via the wireless channel; and directly transmitting, by the selected computing device, a slave connection request to at least one slave input device other than the master input device of the plurality of input devices via the wireless channel; and in response to the slave connection request, directly transmitting, by the at least one slave input device, a slave connection response to the selected computing device via the wireless channel such that the master input device and the at least one slave input device provide input to the selected computing device via the wireless channel.

2. The method of claim 1, wherein the plurality of input devices comprises at least two of: a computer mouse, a keyboard, a pointer, a game controller, and a wireless keypad.

3. The method of claim 1 further comprising:

directly transmitting, by the master input device of the plurality of input devices, the initial connection request to the multiple computing devices via the wireless channel in accordance with a BLUETOOTH™ standard, directly transmitting, by the selected computing device, the initial connection response to the master input device via the wireless channel in accordance with the BLUETOOTH™ standard;

directly transmitting, by the selected computing device, the slave connection request to the at least one slave input device via the wireless channel in accordance with the BLUETOOTH™ standard; and directly transmitting, by the at least one slave input device, the slave connection response to the one of the multiple computing devices via the wireless channel in accordance with the BLUETOOTH™ standard.

4. The method of claim 1 further comprising:

receiving, by the master input device, a request to change input control from the one of the multiple computing devices to a second one of the multiple computing devices; directly transmitting, by the master input device, a request for disconnection of a wireless connection between the plurality of input devices and the selected computing device via the wireless channel;

in response to the request for the disconnection: directly transmitting, by the selected computing device, an acceptance of the disconnection to the master input device via the wireless channel;

directly transmitting, by the one of the multiple computing devices, a slave disconnection request to the each slave input device of the plurality of input devices via the wireless channel;

directly transmitting, by the each of the slave input devices, a slave acceptance of the disconnection to the first multiple computing device via the wireless channel; and establishing a new direct wireless connection between the plurality of input devices and the second one of the multiple computing devices.

5. A method for input control of multiple computing devices from a plurality of input devices, the method comprises:
- receiving, by a master input device of the plurality of input devices, a request to change input control from a first multiple computing device of the multiple computing devices to a second multiple computing device of the multiple computing devices;
- directly transmitting, by the master input device, a request for disconnection of a wireless connection between the plurality of input devices and the first multiple computing device via a wireless channel;
- in response to the request for the disconnection, directly transmitting, by the first multiple computing device, a slave disconnection request to each slave input device other than the master input device of the plurality of input devices via the wireless channel;
- in response to the slave disconnection request, directly transmitting, by each slave input device other than the master input device, a slave acceptance of the disconnection to the first multiple computing device via the wireless channel;
- in response to receiving the slave acceptance of the disconnection, directly transmitting, by the first multiple computing device, an acceptance of the disconnection to the master input device via the wireless channel; and
- establishing a new direct wireless connection between the plurality of input devices and the second multiple computing device,
- such that the master input device and the at least one other slave input device provide input to the selected computing device via the wireless channel.

6. The method of claim 5, wherein establishing the new direct wireless connection between the plurality of input devices and the second multiple computing devices comprises:
- directly transmitting, by the master input device of the plurality of input devices, a new connection request to the multiple computing devices via a wireless channel, wherein the new connection request identifies the second multiple computing device to produce a selected computing device;
- interpreting, by each of the multiple computing devices, the connection request, wherein the selected computing device determines that it is addressed by the connection request and each of other ones of multiple computing devices determine that it is not addressed by the connection request;
- in response to the new connection request:
- directly transmitting, by the second multiple computing device, a new connection response to the master input device via the wireless channel; and
- directly transmitting, by the second multiple computing device, a new slave connection request to at least one slave input device other than the master input device of the plurality of input devices via the wireless channel; and
- in response to the new slave connection request:
- directly transmitting, by the at least one slave input device, a new slave connection response to the second computing device via the wireless channel.

7. The method of claim 6, wherein the plurality of input devices comprises at least two of: a computer mouse, a keyboard, a pointer, a game controller, and a wireless keypad.

8. The method of claim 6 further comprising:
- directly transmitting, by a master input device, the new connection request to the multiple computing devices via the wireless channel in accordance with a BLUETOOTH™ standard;
- directly transmitting, by the second multiple computing device, the new connection response to the master input device via the wireless channel in accordance with the BLUETOOTH™ standard;
- directly transmitting, by the second multiple computing device, the new slave connection request to the at least one slave input device via the wireless channel in accordance with the BLUETOOTH™ standard; and
- directly transmitting, by the at least one slave input device, the new slave connection response to the one of the multiple computing devices via the wireless channel in accordance with the BLUETOOTH™ standard.

9. The method of claim 5 further comprising:
- directly transmitting, by the master input device, the request for disconnection of a wireless connection between the plurality of input devices and the first multiple computing device via a wireless channel in accordance with a BLUETOOTH™ standard;
- directly transmitting, by the first multiple computing device, the acceptance of the disconnection to the master input device via the wireless channel in accordance with the Bluetooth standard;
- directly transmitting, by the first multiple computing device, the slave disconnection request to each slave input device of the plurality of input devices via the wireless channel in accordance with the BLUETOOTH™ standard;
- directly transmitting, by each slave input device, the slave acceptance of the disconnection to the first multiple computing device via the wireless channel in accordance with the BLUETOOTH™ standard.

10. The method of claim 5, wherein the receiving, by the master input device, the request to change input control comprises: detecting a unique input sequence on the master input device.

11. The method of claim 5, wherein the receiving, by the master input device, the request to change input control comprises:
- selecting, by one of the plurality of input devices, a graphical icon on a display of the first multiple computing device via a graphical user interface (GUI);
- in response to the selection of the graphical icon, providing, by the first multiple computing device a graphical listing of each of the multiple computing devices;
- selecting, by the one of the plurality of input devices, the second multiple computing device from the graphical listing; and
- providing, by the first multiple computing device, identity of the second multiple computing device and an indication of the request to change input control.

12. A master input device of a single set of input devices used for input control of multiple computing devices, the master input device comprises:
- processing module; and
- memory operably coupled to the processing module, wherein the memory stores:
- a slave application that is inactive;
- an active host identification code;
- a radio frequency (RF) transceiver application; and
- a master set-up application that is active and includes operational instructions that cause the processing module to:

directly transmit a connection request to the multiple computing devices via a wireless channel, wherein the connection request includes the active host identification code that identifies one of the multiple computing devices to produce a selected computing device; and directly receive, from the selected computing device, a connection response via the wireless channel, wherein the selected computing device establishes, using the active host identification code, a direct wireless connection with at least one slave input device of the plurality of input devices other than the master input device via the wireless channel such that the master input device and the at least one slave input device provide input to the selected computing device via the wireless channel.

13. The master input device of claim 12, wherein the plurality of input devices comprises at least two of: a computer mouse, a keyboard, a pointer, a game controller, and a wireless keypad.

14. The master input device of claim 12, wherein the memory further comprises operational instructions that cause the processing module to:
directly transmit the initial connection request to the multiple computing devices via the wireless channel in accordance with a BLUETOOTH™ standard; and
receive, from the selected computing device, the initial connection response to the master input device via the wireless channel in accordance with the BLUETOOTH™ standard;
directly transmitting, by the selected computing device, the slave connection request to the at least one slave input device via the wireless channel in accordance with the BLUETOOTH™ standard; and
directly receiving by the selected computing device, the slave connection response to the one of the multiple computing devices via the wireless channel in accordance with the BLUETOOTH™ standard.

15. The master input device of claim 12, wherein the memory further comprises operational instructions that cause the processing module to:
receive a request to change input control from the one of the multiple computing devices to a second one of the multiple computing devices;
directly transmit a request for disconnection of a wireless connection between the plurality of input devices and the selected computing device via the wireless channel;
in response to the request for the disconnection, directly receive, from the selected computing device, an acceptance of the disconnection to the master input device via the wireless channel; and
establish a new direct wireless connection between the plurality of input devices and the second one of the multiple computing devices.

16. A slave input device of a plurality of input devices used for input control of multiple computing devices, the slave input device comprises:
processing module; and
memory operably coupled to the processing module, wherein the memory stores:
a master set-up application that is inactive;
an active host identification code that identifies a selected computing device selected by a master input device other than the slave input device;
a radio frequency (RF) transceiver application; and
a slave application that is active and includes operational instructions that cause the processing module to:
directly receive, from the selected computing device, a slave connection request via the wireless channel, wherein the slave connection request includes the active host identification code; and
in response to the slave connection request, directly transmit a second connection response to the selected computing device via the wireless channel such that a master input device and the slave input device provide input to the selected computing device via the wireless channel.

17. The slave input device of claim 16, wherein the plurality of input devices comprises at least two of: a computer mouse, a keyboard, a pointer, a game controller, and a wireless keypad.

18. The slave input device of claim 16, wherein the memory further comprises operational instructions that cause the processing module to:
receive the slave connection request to the at least one slave input device via the wireless channel in accordance with a BLUETOOTH™ standard; and
directly transmit the second connection response to the one of the multiple computing devices via the wireless channel in accordance with the BLUETOOTH™ standard.

19. A computing device capable of receiving input control from a plurality of input devices, the computing device comprises:
processing module; and
memory operably coupled to the processing module, wherein the memory stores operational instructions that cause the processing module to:
receive, from a master input device of a plurality of at least two input devices, an initial connection request via a wireless channel, wherein the initial connection request identifies the computing devices to produce a selected computing device;
determine if the computing device is the selected computing device; and
if the computing device is the selected computing device, in response to the initial connection request:
directly transmit an initial connection response to the master input device via the wireless channel; and
directly transmit a slave connection request to at least one slave input device other than the master input device of plurality of at least two input devices via the wireless channel; and
in response to slave connection request, receive, from the at least one slave input device, a slave connection response via the wireless channel
such that the master input device and the at least one slave input device provide input to the selected computing device via the wireless channel.

20. The computing device of claim 19, wherein the plurality of input devices comprises at least two of: a computer mouse, a keyboard, a pointer, a game controller, and a wireless keypad.

21. The computing device of claim 19, wherein the memory further comprises operational instructions that cause the processing module to:
receive, from the master input device, the initial connection request via the wireless channel in accordance with a BLUETOOTH™ standard;
directly transmit the initial connection response to the master input device via the wireless channel in accordance with the BLUETOOTH™ standard;
directly transmit the slave connection request to the at least one slave input device via the wireless channel in accordance with the BLUETOOTH™ standard; and
receive, from the at least one slave input device, the slave connection response via the wireless channel in accordance with the BLUETOOTH™ standard.

22. The computing device of claim 19, wherein the memory further comprises operational instructions that cause the processing module to:
- receive, from the master input device, a request for disconnection of a wireless connection between the plurality of input devices and the computing device via the wireless channel;
- in response to the request for the disconnection:
- directly transmit an acceptance of the disconnection to the master input device via the wireless channel;
- directly transmit a slave disconnection request to the each slave input device of the plurality of input devices via the wireless channel; and
- receive, from the each of the slave input devices, a slave acceptance of the disconnection to the first multiple computing device via the wireless channel.

23. A master input device of a plurality of input devices used for input control of multiple computing devices, the master input device comprises:
- processing module; and
- memory operably coupled to the processing module, wherein the memory stores operational instructions that cause the processing module to:
- receive a request to change input control from a first multiple computing device of the multiple computing devices to a second multiple computing device of the multiple computing devices;
- directly transmit a request for disconnection of a wireless connection between the plurality of input devices and the first multiple computing device via a wireless channel, wherein, in response to the request for the disconnection, the first multiple computing device transmits a slave disconnection request to each slave input device other than the master input device of the plurality of input devices via the wireless channel and
- wherein, in response to the slave disconnection request, each slave input device transmits a slave acceptance of the disconnection to the first multiple computing device via the wireless channel;
- in response to receiving the slave acceptance of the disconnection, receive, from the first multiple computing device, an acceptance of the disconnection to the master input device via the wireless channel; and
- establish a new direct wireless connection between the plurality of input devices and the second multiple computing device,
- such that the master input device and the at least one other slave input device provide input to the selected computing device via the wireless channel.

24. The master input device of claim 23, wherein the memory further comprises operational instructions that cause the processing module to establish the new direct wireless connection by:
- directly transmitting a new connection request to the multiple computing devices via a wireless channel, wherein the new connection request identifies the second multiple computing device;
- in response to the new connection request:
- receiving, from the second multiple computing device, a new connection response to the master input device via the wireless channel,
- wherein, the second multiple computing device transmits a new slave connection request to at least one slave input device other than the master input device of the plurality of input devices via the wireless channel, and
- wherein, in response to the new slave connection request, the at least one slave input device transmits a new slave connection response to the second multiple computing device via the wireless channel.

25. The master input device of claim 24, wherein the plurality of input devices comprises at least two of: a computer mouse, a keyboard, a pointer, a game controller, and a wireless keypad.

26. The master input device of claim 24, wherein the memory further comprises operational instructions that cause the processing module to:
- directly transmit the new connection request to the multiple computing devices via the wireless channel in accordance with a BLUETOOTH™ standard; and
- receive, from the second multiple computing device, the new connection response to the master input device via the wireless channel in accordance with the BLUETOOTH™ standard.

27. The master input device of claim 23, wherein the memory further comprises operational instructions that cause the processing module to:
- directly transmit the request for disconnection of a wireless connection between the plurality of input devices and the first multiple computing device via a wireless channel in accordance with a BLUETOOTH™ standard;
- receive, from the first multiple computing device, the acceptance of the disconnection to the master input device via the wireless channel in accordance with the BLUETOOTH™ standard.

28. The master input device of claim 23, wherein the memory further comprises operational instructions that cause the processing module to receive the request to change input control by: detecting a unique input sequence on the master input device.

29. The master input device of claim 23, wherein the memory further comprises operational instructions that cause the processing module to receive the request to change input control by:
- selecting, by one of the plurality of input devices, a graphical icon on a display of the first multiple computing device via a graphical user interface (GUI);
- in response to the selection of the graphical icon, providing, by the first multiple computing device a graphical listing of each of the multiple computing devices;
- selecting, by the one of the plurality of input devices, the second multiple computing device from the graphical listing; and
- providing, by the first multiple computing device, identity of the second multiple computing device and an indication of the request to change input control.

* * * * *